(12) United States Patent
Carberry et al.

(10) Patent No.: US 10,610,970 B2
(45) Date of Patent: *Apr. 7, 2020

(54) METHODS AND SYSTEMS TO FORM OPTICAL SURFACES ON OPTICAL FIBERS

(71) Applicant: CORNING OPTICAL COMMUNICATIONS LLC, Hickory, NC (US)

(72) Inventors: Joel Patrick Carberry, Big Flats, NY (US); Anping Liu, Horseheads, NY (US); Barada Kanta Nayak, Painted Post, NY (US)

(73) Assignee: Corning Optical Communications LLC, Charlotte, NC (US)

(*) Notice: Subject to any disclaimer, the term of this patent is extended or adjusted under 35 U.S.C. 154(b) by 224 days.

This patent is subject to a terminal disclaimer.

(21) Appl. No.: 15/716,824

(22) Filed: Sep. 27, 2017

(65) Prior Publication Data
US 2018/0031770 A1   Feb. 1, 2018

Related U.S. Application Data

(63) Continuation of application No. 14/543,979, filed on Nov. 18, 2014, now Pat. No. 9,810,847.

(60) Provisional application No. 61/909,505, filed on Nov. 27, 2013.

(51) Int. Cl.
| G02B 6/25 | (2006.01) |
| B23K 26/38 | (2014.01) |
| G02B 6/32 | (2006.01) |
| G02B 6/24 | (2006.01) |
| B23K 26/06 | (2014.01) |
| G02B 6/38 | (2006.01) |
| B23K 103/00 | (2006.01) |

(52) U.S. Cl.
CPC ......... *B23K 26/38* (2013.01); *B23K 26/0619* (2015.10); *G02B 6/25* (2013.01); *G02B 6/3861* (2013.01); *B23K 2103/54* (2018.08)

(58) Field of Classification Search
CPC ...... B23K 26/38; B23K 26/0619; G02B 8/25; G02B 6/3861; G02B 6/32; G02B 6/241
See application file for complete search history.

(56) References Cited

U.S. PATENT DOCUMENTS

| 4,932,989 A | 6/1990 | Presby |
| 5,421,928 A | 6/1995 | Knecht et al. |
| 7,142,741 B2 | 11/2006 | Osborne |

(Continued)

FOREIGN PATENT DOCUMENTS

EP   1330331 B1   4/2009

*Primary Examiner* — Mathieu D Vargot
(74) *Attorney, Agent, or Firm* — Kapil U. Banakar

(57) ABSTRACT

A method of forming an optical surface on an end portion of an optical fiber comprises inserting the optical fiber through a ferrule bore of a ferrule so that the end portion extends past an end face on the ferrule. At least one laser beam is emitted from at least one laser and directed to the end face of the ferrule. The at least one laser beam is shaped into an ellipse and comprises at least 90 percent linearly-polarized light incident on the end face of the ferrule as S-polarized light. The at least one laser is operated so that the S-polarized light reflects off the end face of the ferrule and cleaves the end portion of the optical fiber.

30 Claims, 10 Drawing Sheets

(56) References Cited

U.S. PATENT DOCUMENTS 9,089,931 B1 7/2015 Carberry et al.
9,810,847 B1 * 11/2017 Carberry .................. G02B 6/25

* cited by examiner

METHODS AND SYSTEMS TO FORM OPTICAL SURFACES ON OPTICAL FIBERS

PRIORITY APPLICATIONS

This application is a continuation under 35 U.S.C. § 120 of U.S. patent application Ser. No. 14/543,979 filed on Nov. 18, 2014, now U.S. Pat. No. 9,810,847 which claims the benefit of priority under 35 U.S.C. § 119 of U.S. Application Ser. No. 61/909,505, filed on Nov. 27, 2013, the content of which is relied upon and incorporated herein by reference in its entirety.

BACKGROUND

The disclosure relates generally to optical fibers and more particularly to methods and systems to form an optical surface on an end portion of at least one optical fiber.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, fixed location relative to the housing. This allows an optical connection to be established when the optical fiber is aligned with another optical fiber provided in the mating component (the other fiber optic connector or adapter).

The bore of the ferrule in a fiber optic connector may extend from a rear of the ferrule to a front of the ferrule. With such a design, an optical fiber can be passed through the ferrule so as to extend beyond an end face at the front of the ferrule. After securing the optical fiber relative to the ferrule (e.g., by using a bonding agent in the bore), an optical surface may be formed on the optical fiber. The optical surface is typically formed a precise distance from the end face of the ferrule according to very tight dimensional standards to reduce signal attenuation. For example, the optical surface of the optical fiber may need to be formed within a few microns of the end face of the ferrule.

One conventional method of forming an optical surface involves a mechanical cleaving step followed by several mechanical polishing steps. Such methods can be time-consuming and labor-intensive due to the number of polishing steps required to form the optical surface within a few microns of the end face of the ferrule. For example, it may be necessary to begin with coarse grit when mechanically polishing and switch to finer grits in subsequent polishing steps to carefully control the distance of the end of the optical fiber from the end face of the ferrule and to form an optical surface of high quality.

Various techniques for laser cleaving and polishing an optical fiber are also known. Although these techniques may help reduce or eliminate some of the mechanical polishing steps associated with forming an optical surface, there remains room for improvement. Using one or more lasers to form an optical surface sufficiently close to the end face of the ferrule without damaging the ferrule remains a challenge.

SUMMARY

One embodiment of this disclosure relates to a method of forming an optical surface on an end portion of an optical fiber. The method involves inserting the optical fiber through a ferrule bore of a ferrule so that the end portion of the optical fiber extends past an end face of the ferrule. The optical fiber is secured to the ferrule by a bonding agent disposed within at least a portion of the ferrule bore. The method also involves emitting at least one laser beam from at least one laser. The at least one laser beam is directed from the at least one laser to the end face of the ferrule at a location spaced from the ferrule bore. The at least one laser beam is shaped into an ellipse when directed to the end face of the ferrule and comprises at least 90 percent linearly-polarized light incident on the end face of the ferrule as S-polarized light. The at least one laser is operated so that the S-polarized light reflects off the end face of the ferrule and cleaves the end portion of the optical fiber.

Another embodiment of this disclosure relates to a method of forming an optical surface on an end portion of an optical fiber. The method involves inserting the optical fiber through a ferrule bore of a ferrule so that the end portion of the optical fiber extends past an end face of the ferrule. The optical fiber is secured to the ferrule by a bonding agent disposed within at least a portion of the ferrule bore. The method also involves emitting at least one laser beam from at least one laser and directing the at least one laser beam from the at least one laser to the end face of the ferrule. The least one laser beam is shaped into an ellipse when directed to the end face of the ferrule. The at least one laser is operated so that the at least one laser beam reflects off the end face of the ferrule and cleaves the end portion of the optical fiber by: (a) ablating some of the end portion of the optical fiber with the at least one laser beam emitted at the first wavelength; (b) tuning the at least one laser to a different wavelength; and (c) ablating an additional amount of the end portion of the optical fiber with the at least one laser beam emitted at the different wavelength.

An additional embodiment of the disclosure relates to a system for forming an optical surface on an end portion of an optical fiber that protrudes from an end face of a ferrule after extending through a ferrule bore. The system includes at least one laser configured to emit at least one laser beam and a fixture configured to securely support the ferrule relative to the at least one laser. The system is configured to shape the at least one laser beam into an ellipse and direct the at least one laser beam to the end face of the ferrule so that: the at least one laser beam comprises at least 90 percent linearly-polarized light incident on the end face of the ferrule as S-polarized light; and the S-polarized light reflects off the end face of the ferrule to be incident on the end portion of the optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Figure 1:
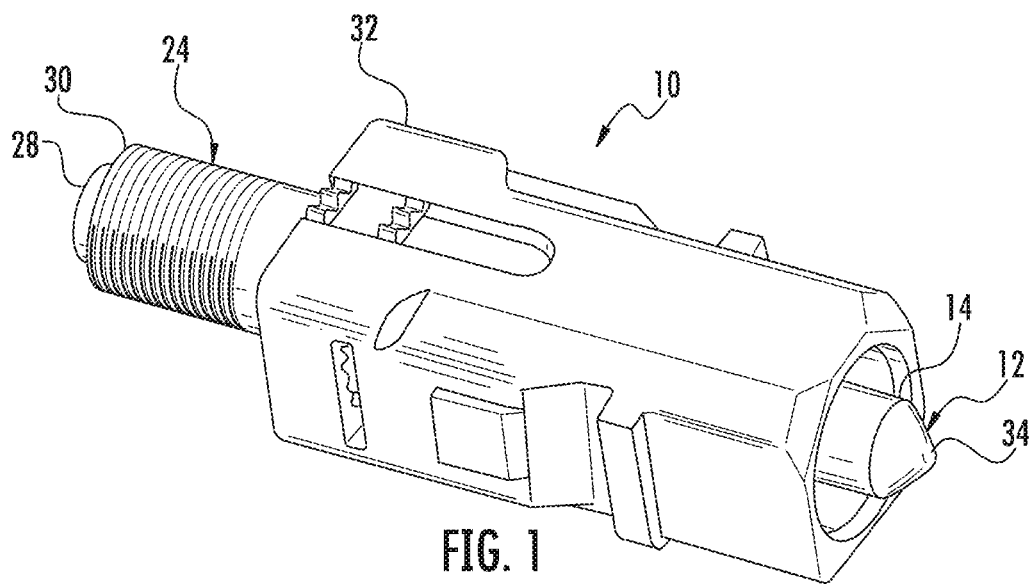
FIG. 1 a perspective view of an example of a fiber optic connector.
Figure 2:
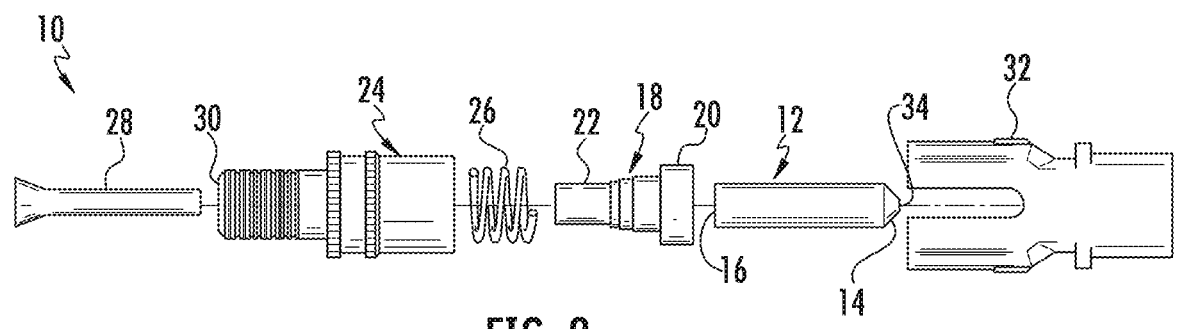
FIG. 2 is an exploded side view the fiber optic connector of FIG. 1.

Various embodiments will be further clarified by examples in the description below. In general, the description relates to laser cleaving systems and methods of forming an optical surface on one or more optical fibers. The methods may be part of a cable assembly process for a fiber optic cable. That is, the methods may be part of terminating one or more optical fibers from a fiber optic cable with a fiber optic connector to form a cable assembly. One example of a fiber optic connector ("connector") 10 for such a cable assembly is shown in FIGS. 1 and 2. Although the connector 10 is shown in the form of a SC-type connector, the methods described below may be applicable to processes involving different fiber optic connector designs. This includes ST, LC, MPO, MTP, and other single fiber or multi-fiber connector designs, for example.

As shown in FIGS. 1 and 2, the connector 10 includes a ferrule 12 having a mating end 14 and an insertion end 16, a ferrule holder 18 having opposed first and second end portions 20, 22, and an inner housing or connector body 24. The insertion end 16 of the ferrule 12 is received in the first end portion 20 of the ferrule holder 18 while the mating end 14 remains outside the ferrule holder 18. The second end portion 22 of the ferrule holder 18 is received in the inner housing 24. A spring 26 may be disposed around the second end portion 22 and configured to interact with walls of the inner housing 24 to bias the ferrule holder 18 (and ferrule 12). Additionally, a lead-in tube 28 may extend from a rear end 30 of the inner housing 24 to within the second end portion 22 of the ferrule holder 18 to help guide the insertion of an optical fiber (not shown in FIGS. 1 and 2) into the ferrule 12. An outer shroud 32 is positioned over the assembled ferrule 12, ferrule holder 18, and inner housing 24, with the overall configuration being such that the mating end 14 of the ferrule 12 presents an end face 34 configured to contact a mating component (e.g., another fiber optic connector; not shown).

In a manner not shown herein, a fiber optic cable providing the optical fiber also includes one or more layers of material (e.g., strength layer of aramid yarn) that may be crimped onto the rear end 30 of the inner housing 24. A crimp band may be provided for this purpose. Additionally, a strain-relieving boot may be placed over the crimped region and extend rearwardly to cover a portion of the fiber optic cable. Variations of these aspects will be appreciated by persons skilled in the design of fiber optic cable assemblies. Again, the embodiment shown in FIGS. 1 and 2 is merely an example of a fiber optic connector that may be used in the systems and methods described below. The general overview has been provided simply to facilitate discussion of the systems and methods.

Figure 3:
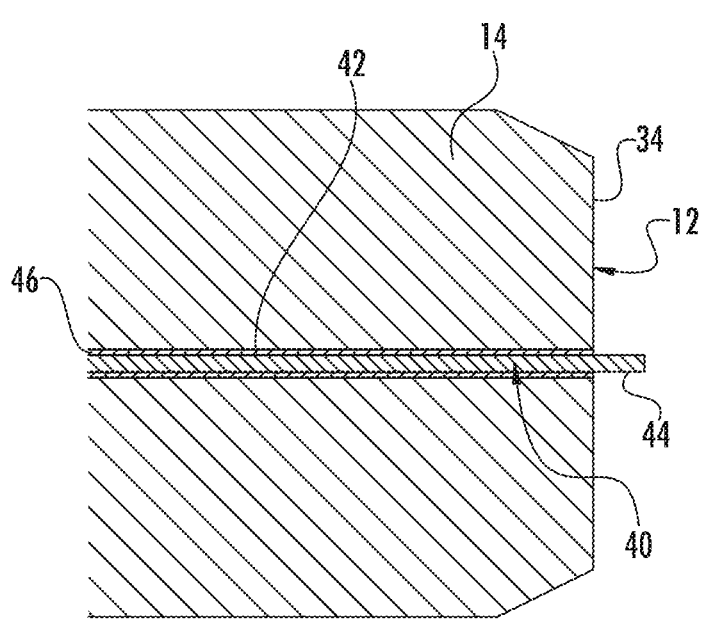
FIG. 3 is a cross-sectional side view of a portion of a ferrule of the fiber optic connector of FIG. 1, wherein an optical fiber is secured in the ferrule by a bonding agent.

FIG. 3 illustrates a portion of the ferrule 12 in further detail after an optical fiber 40 has been inserted into a ferrule bore (also referred to as a "micro-hole") 42. The optical fiber 40 is inserted from a rear of the ferrule bore 42 and extended until an end portion 44 of the optical fiber exits an opening on the end face 34 of the ferrule 12. Thus, the end portion 44 protrudes past the end face 34. At least a portion of the optical fiber 44 remaining in the ferrule bore 42 is secured to the ferrule 12 by a bonding agent 46 (also referred to as an "adhesive composition"). Securing the optical fiber 40 relative to the ferrule 12 facilitates processing the end portion 44 of the optical fiber 40 to form an optical surface. The systems and methods describe below involve using one or more lasers to complete such processing.

Figure 4:
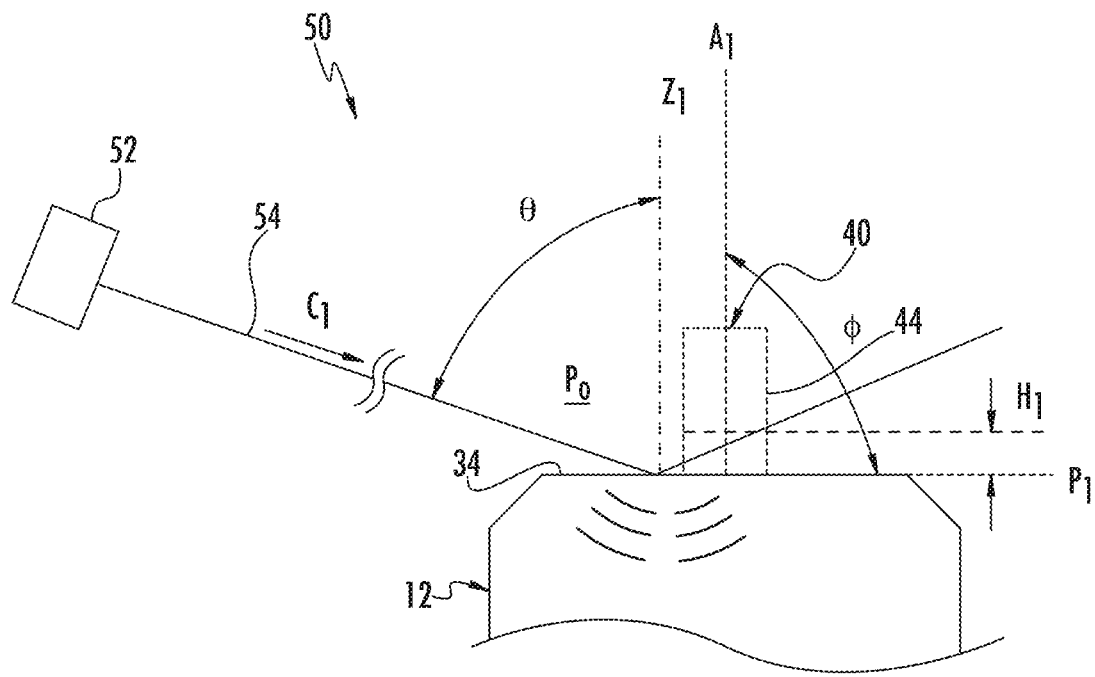
FIG. 4 is a schematic side view of one embodiment of a laser cleaving system.

To this end, FIG. 4 illustrates one embodiment of a laser cleaving system 50 for forming an optical surface on the optical fiber 40 very close to the end face 34 of the ferrule 12. The laser cleaving system 50 includes a laser 52 configured to emit a laser beam 54 that ultimately cleaves the end portion 44 of the optical fiber 40 to form the optical surface. For example, energy from the laser beam 54 may melt or ablate the end portion 44 to form the optical surface. As will be described in further detail below, the laser beam 54 is directed to the end face 34 at a location spaced from the ferrule bore 42 (and, therefore, the end portion 44 of the optical fiber 40). The laser beam 54 is also directed at an angle relative to the end face 34 so as to first reflect off the end face 34 before being incident on the end portion 44 of the optical fiber 40.

With this in mind, it can be appreciated how FIG. 4 is a schematic side view orthogonal to a plane of incidence $P_0$ formed by a propagation direction $C_1$ of the laser beam 54 and a vector $Z_1$ that is perpendicular to the portion of the end face 34 on which the laser beam 54 is incident. An angle of incidence $\theta$ (theta) is defined between the vector $Z_1$ and the propagation direction $C_1$. The optical fiber 40 has an optical axis $A_1$ extending from the ferrule 12 at an angle $\phi$ (phi) relative to a geometric plane $P_1$ containing the end face 34 of the ferrule 12. Although the optical axis $A_1$ is shown as being perpendicular to the end face 34 in the embodiment shown, other configurations where angle $\phi$ is not 90° are also possible. Regardless, the laser beam 54 reflects off the end face 34 and is thereafter incident on the end portion 44 of the optical fiber 40 in a manner that forms the optical surface less than a distance $H_1$ from the end face 34.

The distance $H_1$ may be less than 20 μm, or even less than 10 μm. To obtain such small distances, other laser cleaving systems involve directing a laser beam to be incident on the end portion 44 of the optical fiber 40 before reaching the end face 34, or directing a laser beam so that a beam spot is simultaneously incident on both the end portion 44 of the optical fiber 40 and a portion of the end face 34. The lasers are controlled in particular ways (e.g., specific movements relative to the ferrule 12, power levels, beam shapes, wavelengths, polarizations, etc.) to reduce the potential of thermal cracks or other damage on the end face 34 of the ferrule 12 resulting from thermal energies that are absorbed by the ferrule 12 and/or debris from the optical fiber 40 that lands on the end face 34. Such systems and techniques may not be suitable for ferrules in which an optical fiber is secured using a bonding agent that heats and cools quickly. Examples of such a bonding agent are provided toward the end of this description.

Applicants have discovered that taking a different, counterintuitive approach, namely initially placing more focus on the ferrule 12 (i.e., the component where absorption of thermal energy is not desired) rather than the optical fiber 40, can still result in a cleave/optical surface close to the end face 34 without causing the end face 34 to crack. In one embodiment, this may be achieved by emitting the laser beam 54 with a wavelength between 8.0 and 9.4 μm. A $CO_2$ laser with a wavelength of 9.3 μm may be used, for example. Other lasers capable of operating within this range, such as quantum cascade lasers (QCL's) or other semiconductor lasers, may be used as the laser 52 in alternative embodiments. The ferrule 12 may comprise zirconia and the optical fiber 40 may comprise silica. At wavelengths between 8.0 and 9.4 μm, Applicants have found that the absorption of laser energy is sufficiently high in silica and sufficiently low in zirconia to allow for the laser cleaving systems and methods described herein. In one specific embodiment, the ferrule 12 comprises 3% yttria stabilized zirconia.

The systems and methods disclosed herein also differ from conventional approaches in that laser fluence may be decreased rather than increased to form an optical surface close to the end face 34 of the ferrule 12 (i.e., to result in a "close" cleave). Applicants have discovered that the optical surface may still be formed within 20 μm of the end face without the ferrule cracking due to thermal absorption and expansion when laser fluence is less than 250 $J/cm^2$. Persons skilled in the art will appreciate the many different parameters of the laser cleaving system 50 that may be varied to achieve the desired laser fluence, such as the power of the laser 52, number of pulses, duration or exposure time of each pulse, size of a beam spot on the end face 34 of the ferrule 12 (discussed below), etc. In some embodiments, laser fluence is less than 100 $J/cm^2$, or even less than 20 $J/cm^2$, or even lower, such as less than 10 $J/cm^2$. The low laser fluence may mean significantly lower power requirements and/or faster processing times compared to conventional approaches, which in turn may reduce the costs associated with the laser cleaving system 50.

Figure 5:
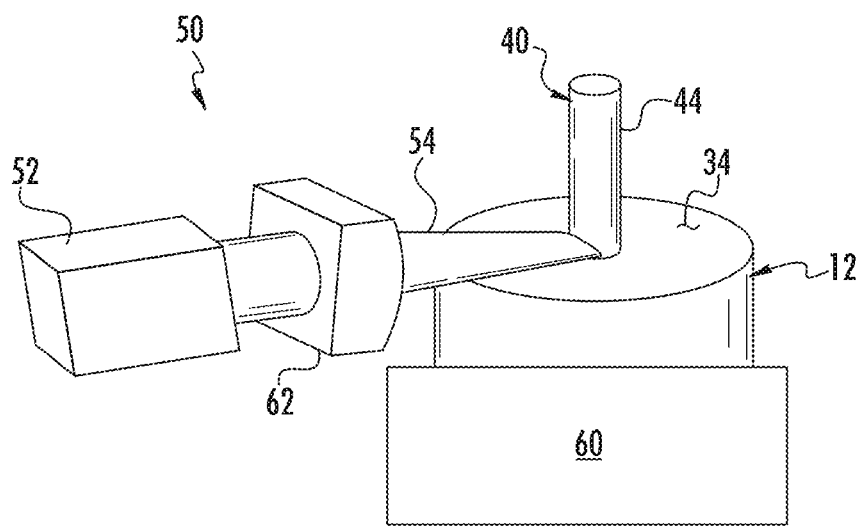
FIG. 5 is a schematic perspective view of the laser cleaving system of FIG. 4.

FIGS. 5-8 illustrate various aspects of one embodiment of the laser cleaving system 50 and associated methods of forming the optical surface. As schematically shown in FIG. 5, the laser cleaving system 50 includes the laser 52 and a fixture 60 configured to securely support the ferrule 12 relative to the laser 52. The laser 52 and ferrule 12 are stationary and spaced apart. Thus, the laser cleaving system 50 is static; no relative movement between the profile of the laser beam 54 and the ferrule 12 occurs while the laser beam 54 is emitted. This may not be the case in other embodiments, however, where there may be relative movement while the laser beam 54 is emitted (e.g., the laser beam 54 sweeping past the ferrule 12 or vice-versa). An example of such an embodiment is described further below. There may also be embodiments where there is only relative movement between periods of time when the laser beam 54 is emitted. For example, operating the laser 52 for several pulses in a first position relative to the ferrule 12 and optical fiber 40, and then before operating the laser 52 again, moving the laser 52 or fixture 60 so that the laser 52 is in a second position relative to the ferrule 12 and optical fiber 40.

Figure 6:
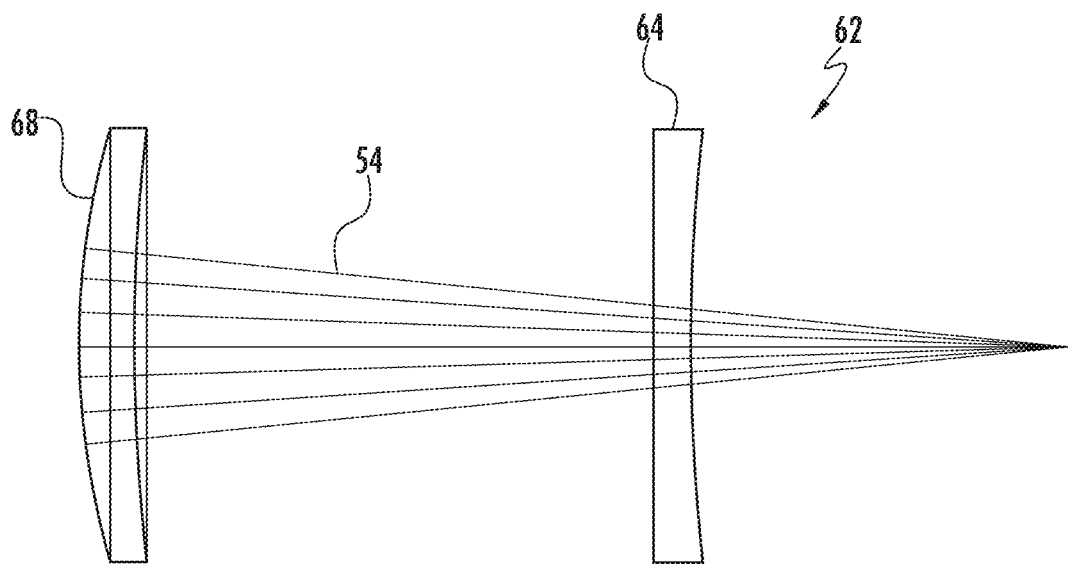
FIG. 6 is a schematic top view and schematic side view of a focusing system for forming an elliptical laser beam.
Figure 6:
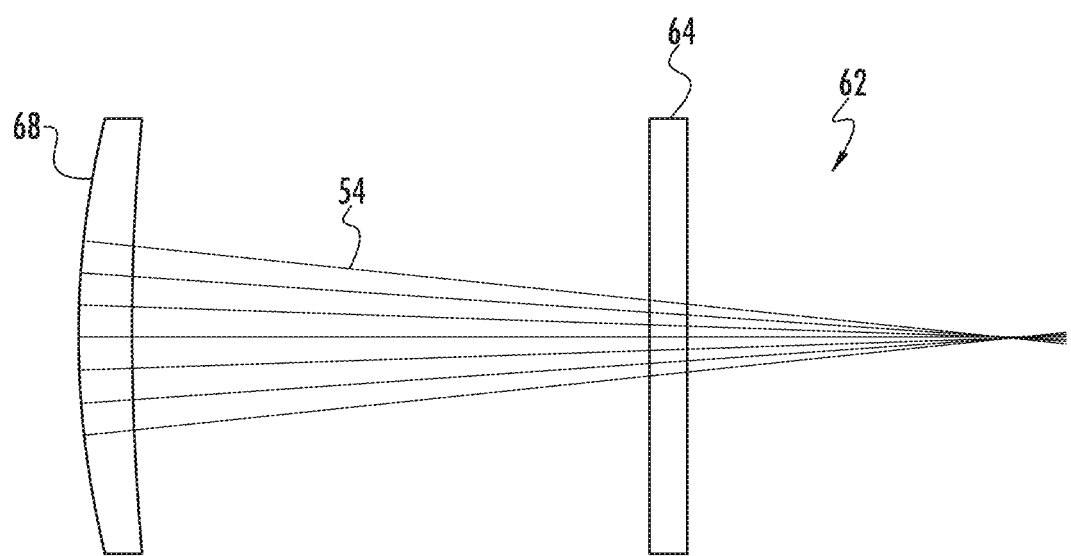

Still referring to FIG. 5, the laser cleaving system 50 is configured so that the laser 52 emits an elliptical beam on the end face 34 of the ferrule 12. To this end, the laser cleaving system 50 may include a focusing system 62 having one or more non-spherical lenses or other elements configured to shape the laser beam 54 into an ellipse (when viewed perpendicular to the propagation direction $C_1$; FIG. 4). The focusing system 62 may, for example, include a cylindrical or acylindrical lens 64 (FIG. 6) to focus the width of the laser beam 54 in one plane. The cylindrical or acylindrical lens 64 may be used in addition to a spherical lens 68, as schematically shown in FIG. 6. In such embodiments, the width of the laser beam 54 in a first plane is determined by the focusing characteristics of both the spherical lens 68 and cylindrical lens 64 and the distance between them. The cylindrical lens 64 has no focus power in the second plane. Such a configuration results in the laser beam 54 having an elliptical profile with both a major radius and minor radius smaller than an initial radius of the laser beam 54.

Figure 7:
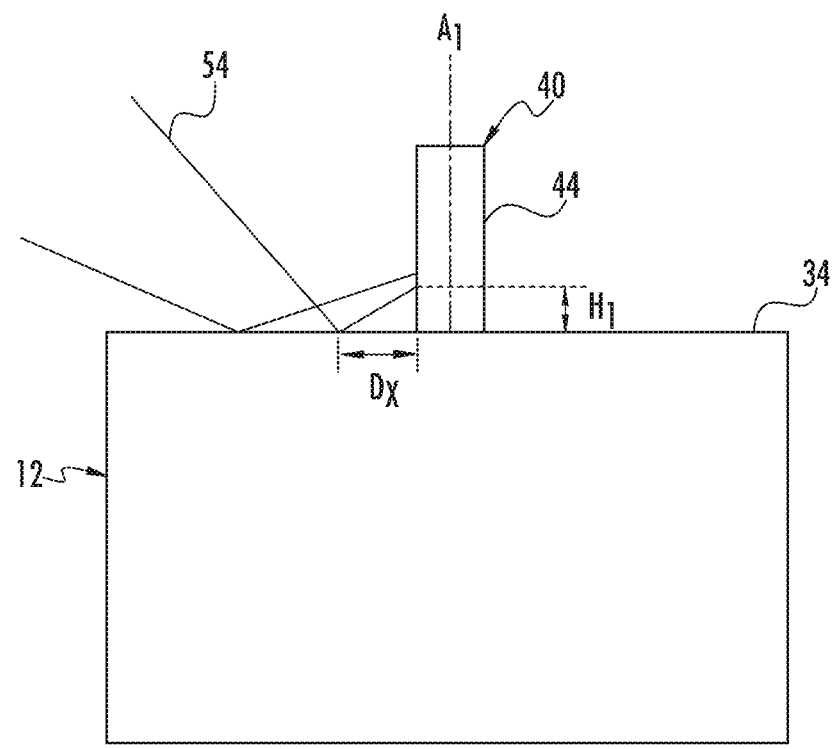
FIG. 7 is a schematic side view of a laser beam being emitted and reflected off an end face of a ferrule to be incident on an optical fiber.
Figure 8:
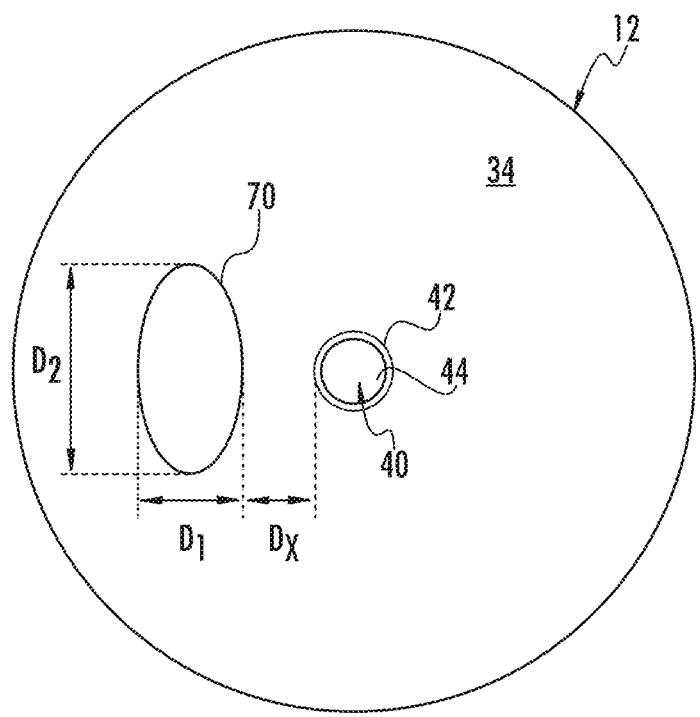
FIG. 8 is a schematic top view of the ferrule represented in FIG. 7, with the laser beam that is emitted forming an elliptical beam spot on the end face of the ferrule.

FIGS. 7 and 8 schematically illustrate the interaction between the laser beam 54, end face 34 of ferrule 12, and end portion 44 of optical fiber 40. The elliptical laser beam 54 results in an elliptical beam spot 70 on the end face 34. The beam spot 70 is located a distance $D_x$ from the ferrule bore 42 (measured edge-to-edge) and has a dimension of $D_1$ along a minor axis and a dimension of $D_2$ along a major axis. The distance $D_x$ may be, for example, between 5 μm and 40 μm in some embodiments. Directing the laser beam 54 so that the distance $D_x$ is at least 5 μm helps reduce the absorption of laser energy in the bonding agent 46 (FIG. 3), which may be subject to melting and/or degradation if excessive amounts of laser energy are absorbed. Such melting and/or degradation may, in turn, undesirably affect adhesion strength or accurate positioning between the optical fiber 40 and ferrule 12. Appropriately setting the distance $D_x$ is believed to be particularly desirable for the bonding agents contemplated at the end of this description.

In terms of the beam spot 70, the dimension $D_1$ being at least 50 μm and/or the dimension $D_2$ being at least 30 μm is believed to result in sizes that help avoid excessive amounts of laser energy being absorbed by the ferrule 12. The angle of incidence θ (FIG. 4) may alternatively or additionally be set within a desired range to help avoid excessive amounts of laser energy being absorbed by the ferrule 12. In some embodiments, the angle of incidence θ is desirably between 45° and 85°. In other embodiments, the angle of incidence θ is desirably between 67° and 85°, particularly if the laser beam 54 comprises at least 90 percent linearly-polarized light configured to be incident on the ferrule 34 as S-polarized light (discussed below). In still other embodiments, the angle of incidence θ is desirably between 75° and 85°.

The principles described above may be applicable to laser cleaving systems having a variety of configurations. Several examples will now be described, although only differences from the laser cleaving system 50 will be discussed for clarity and conciseness.

Figure 9:
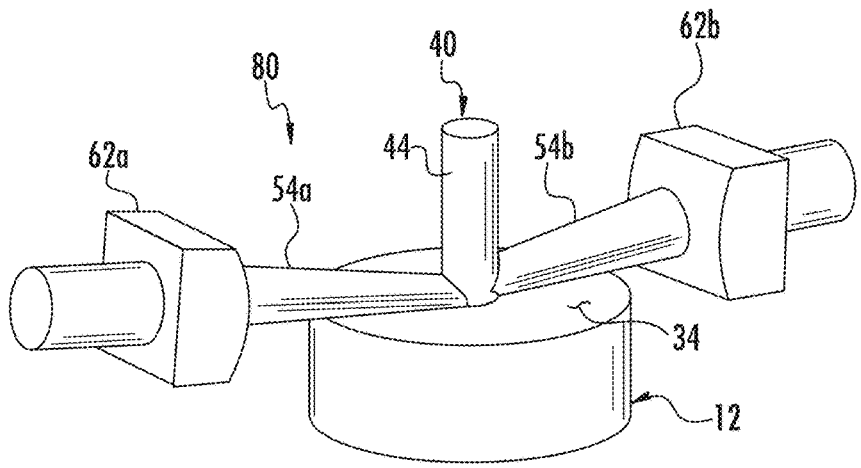
FIG. 9 is a schematic perspective view of another embodiment of a laser cleaving system.
Figure 9A:
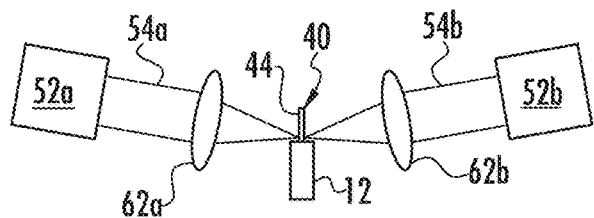
FIG. 9A is a schematic diagram the laser cleaving system of FIG. 9.

To this end, FIGS. 9 and 9A schematically illustrate an example of a laser cleaving system 80 in which two laser beams 54a, 54b are used to form the optical surface on the end portion 44 of the optical fiber 40. The laser beams 54a, 54b may be emitted from respective lasers 52a, 52b and are shaped into elliptical beams by respective focusing systems 62a, 62b. Each laser beam 54a, 54b is incident on the end face 34 of the ferrule 12 at a different location and, as a result, reflects off the end face 34 to be incident on the end portion 44 of the optical fiber 40 at a different location. The overall laser energy required to cleave the end portion 44 can be split between the laser beams 54a, 54b so that the overall energy delivered to the end face 34 of the ferrule 12 is spread over a larger area (e.g., two beam spots at two different locations instead of a single beam spot). Although only two lasers 52a, 52b are shown in FIG. 9, embodiments involving a different number of lasers and laser beams will be appreciated (e.g., three or four lasers and laser beams).

Figure 10:
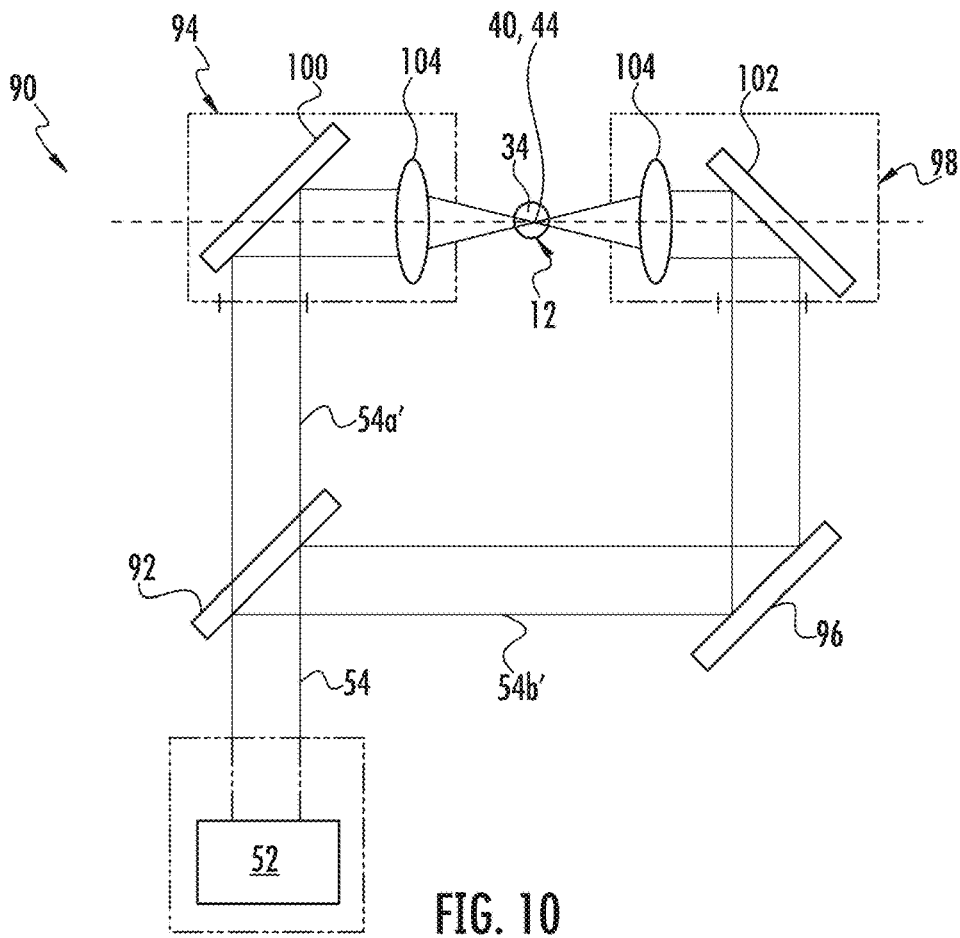
FIG. 10 is a schematic diagram of yet another embodiment of a laser cleaving system.
Figure 11:
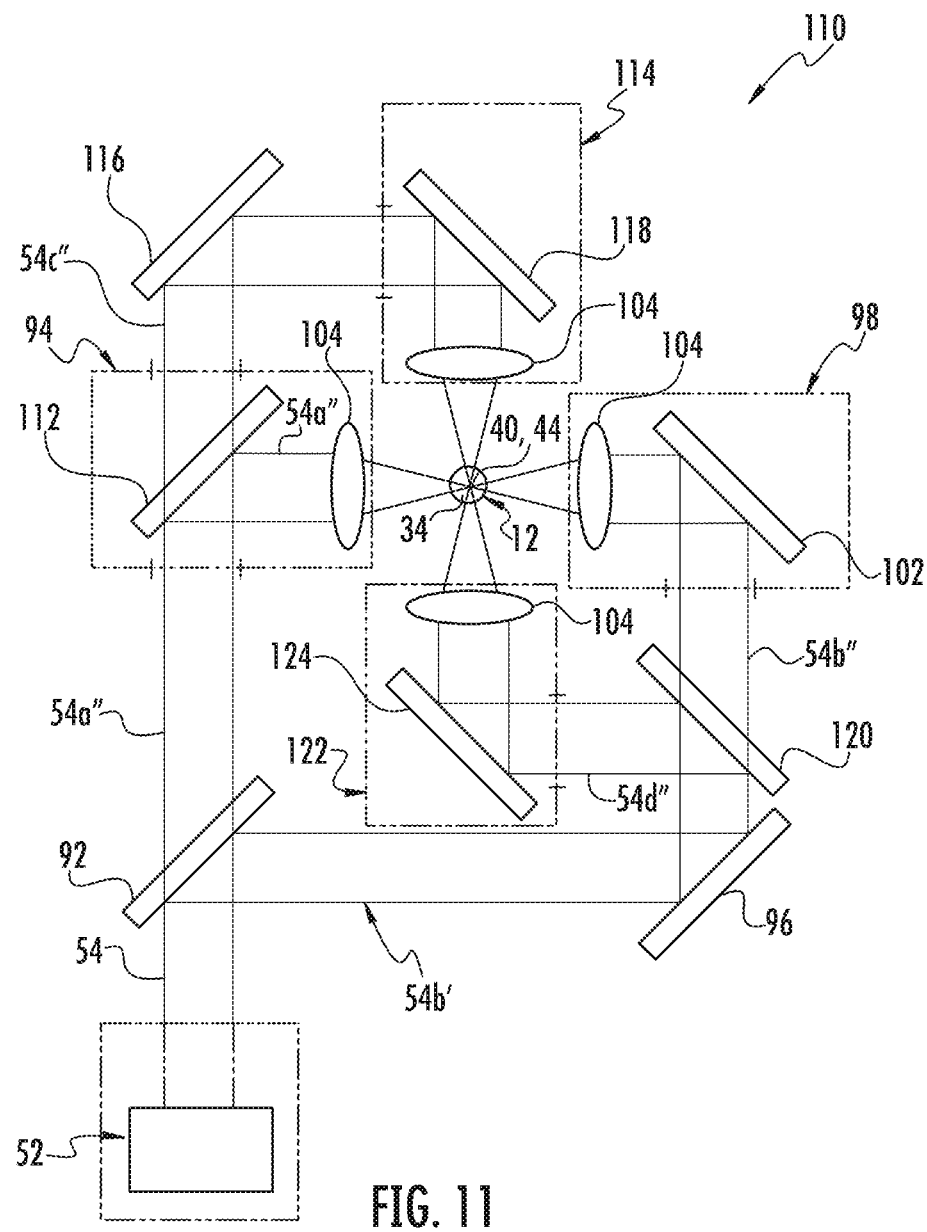
FIG. 11 is a schematic diagram of yet another embodiment of a laser cleaving system.

Embodiments will also be appreciated where one or more lasers 52 emit a laser beam 54 that is split into different portions to distribute the laser energy incident on the end face 34 and end portion 44 of the optical fiber 40 (after reflecting from the end face 34). FIGS. 10 and 11 are schematic diagrams of laser cleaving systems 90, 110 according to such embodiments. As can be seen in FIG. 10, the laser cleaving system 90 includes a beam splitter 92 to direct a first portion 54a' of the laser beam emitted by the laser to a first focusing system 94 and a second portion 54b' of the laser beam to a reflective mirror 96. The reflective mirror 96, in turn, directs the second portion 54b' to a second focusing system 98. The first and second focusing systems 94, 98 include respective first and second reflective mirrors 100, 102 to direct the first and second portions 54a', 54b' through one or more beam-shaping elements 104 (e.g., the cylindrical lens 64 and spherical lens 68 in FIG. 68) and toward first and second locations on the end face 34 of the ferrule 12. The manner in which the first and second portions 54a', 54b' are directed to, incident on, and reflected from the end face 34 may be similar to the laser beams 54a, 54b of the laser cleaving system 80 (FIGS. 9 and 9A).

Now referring to FIG. 11, the laser cleaving system 110 is similar to the laser cleaving system 90, but the first reflective mirror 100 is replaced by a beam splitter 112. The beam splitter 112 splits the first portion 54a' of the laser beam into a portion 54a'' that is directed through the beam-shaping elements 104 and toward the end face 34 of the ferrule 12 and a portion 54c'' that is directed to a third focusing system 114 by a reflective mirror 116. The third focusing system 114, which may include a reflective mirror 118 and beam-shaping elements 104, directs the portion 54c'' to a third location on the end face 34 of the ferrule 12. Another difference from the laser cleaving system 90 (FIG. 10) is that the laser cleaving system 110 includes a beam splitter 120 to split the second portion 54b' of the laser beam 54 into a portion 54b'' that is directed to the second focusing system 98 and a portion 54d'' that is directed to a fourth focusing system 122. The fourth focusing system 122, which may include a reflective mirror 124 and beam-shaping elements 104, directs the portion 54d'' to a fourth location on the end face 34 of the ferrule 12.

Figure 12:
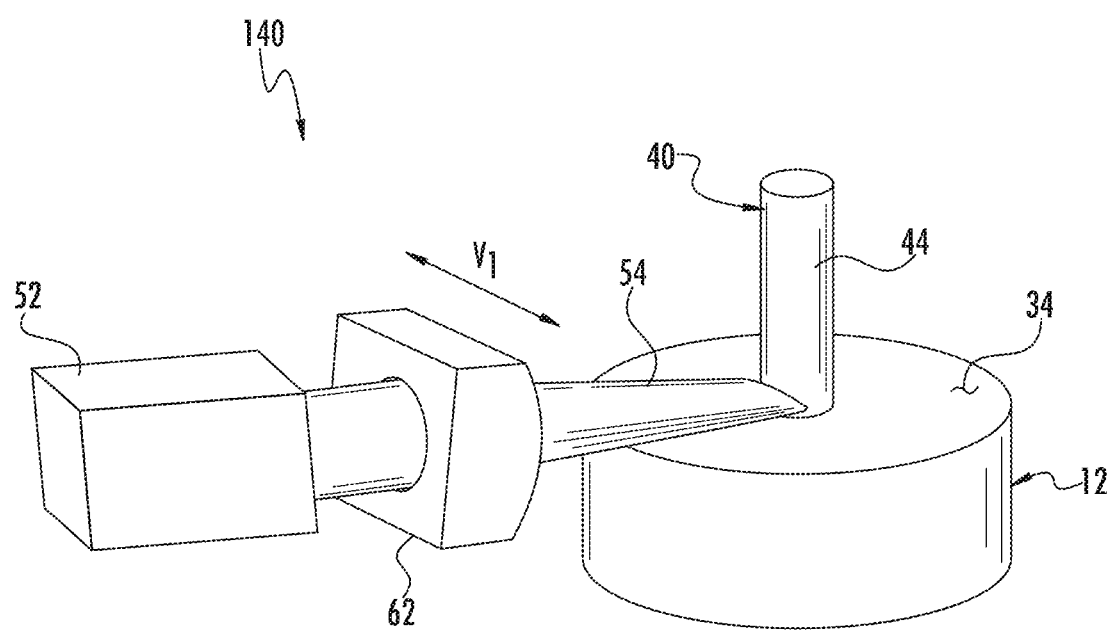
FIG. 12 is a schematic perspective view of yet another embodiment of a laser cleaving system.

It was mentioned above how embodiments involving relative movement between one or more laser beams 54 and the ferrule 12 (and optical fiber 40) will also be appreciated. To this end, FIG. 12 illustrates an example of a laser cleaving system 140 similar to the laser cleaving system 50 (FIG. 5), but being configured so that the laser 52 and focusing system 62 translate back-and-forth at a velocity $V_1$ in a direction perpendicular to the propagation direction $C_1$ (FIG. 4) so that the laser beam 54 sweeps across the end face 34 of the ferrule 12. In alternative embodiments, only the laser 52 or only the focusing system 62 may move, depending on the configuration. Alternatively or additionally, the fixture 60 (FIG. 5; omitted from FIG. 12 to simplify matters) that securely supports the ferrule 12 may translate or rotate.

It was also mentioned above how the laser beam(s) may comprise linearly polarized light in some embodiments. In some embodiments, the laser beam(s) may comprise at least 90 percent linearly polarized light, which is believed to more readily reflect off the end face 34 of the ferrule 12, particularly if the polarized light is oriented perpendicular to the plane of incidence $P_0$ (such polarized light also referred to as "S-polarized" light). Indeed, in some embodiments, the laser beam(s) may even comprise 100 percent linearly polarized light perpendicular to the plane of incidence $P_0$.

As used herein, the term "optical surface" refers to an end surface of the optical fiber 40 that requires minimal or no further processing before being used to optically couple the fiber optic connector 10 to a mating device. Thus, after forming the optical surface using methods and laser cleaving systems disclosed herein, there may still be a quick mechanical polish or laser polish of the optical surface into a final form. Any polishing is nevertheless significantly less extensive compared to conventional approaches where the end portion 44 of the optical fiber 40 is not first processed by a laser cleaving system. The optical surface having a maximum and minimum distance $H_1$ within 10 μm of the distance (s) $H_1$ associated with the final form can be considered to involve "minimal processing."

Figure 13A:
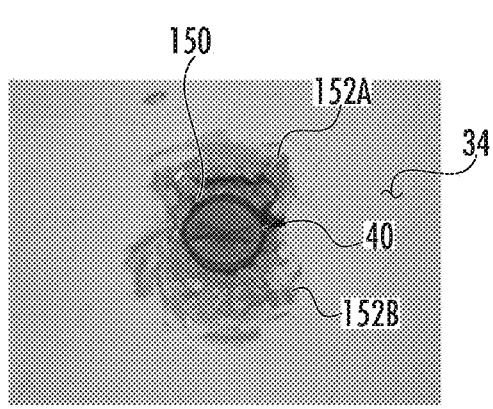
FIGS. 13A and 13B are top close-up views of an exemplary optical surface of an optical fiber extending from an end face of a ferrule after laser cleaving observed at a first magnification and a second magnification, respectively.
Figure 13B:
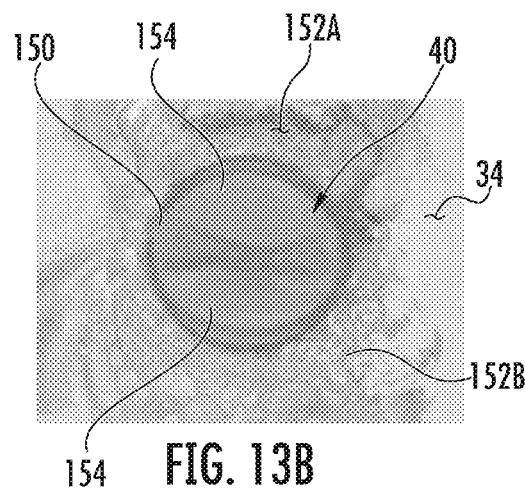
Figure 14A:
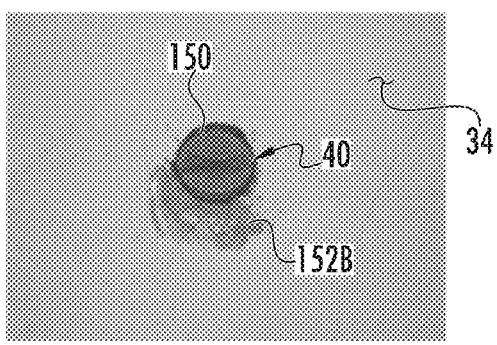
FIGS. 14A and 14B are top close-up views of the optical surface and the end face of FIGS. 13A and 13B, respectively, after subsequent wiping with isopropyl alcohol.
Figure 14B:
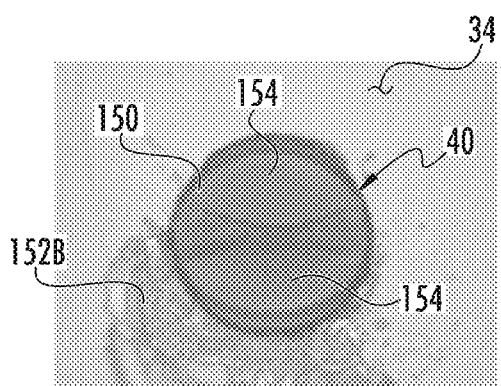
Figure 15A:
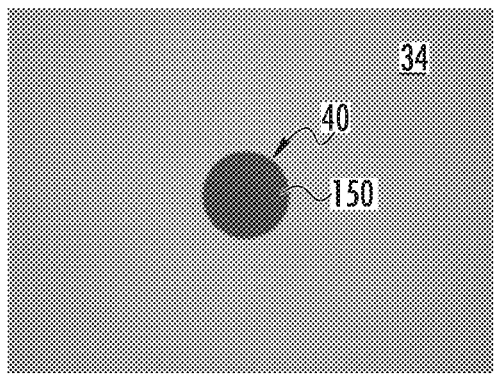
FIGS. 15A and 15B are top close-up views of the optical surface and the end face of FIGS. 14A and 14B, respectively, after subsequent hand polishing.
Figure 15B:
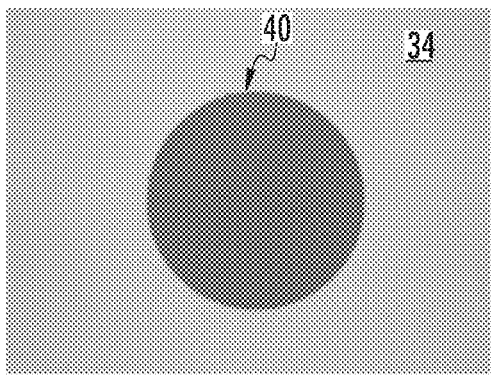

With this in mind, FIGS. 13A and 13B are top close-up views of an exemplary optical surface 150 of an optical fiber 40 at a first magnification and second magnification, respectively, where the optical surface 150 is formed by a laser cleaving system that reflects portions of a laser beam 54 (or two separate laser beams 54) off the end face 34 of the ferrule 12 at two different locations. The laser cleaving systems 80 (FIG. 9) and 90 (FIG. 10), for example, may result in an optical surface like that shown in FIGS. 13A and 13B. Ablated material of the optical fiber 40 generated by the thermal forming of the optical surface 150 may be disposed as ablated material buildup areas 152A, 152B on the end face 34 of the ferrule 12. The optical surface 150 may include depressions 154 identifying where the portions of the laser beam 54 contributed energy. FIGS. 14A and 14B are top close-up views of the optical surface 150 and the end face 34 of FIGS. 13A and 13B, respectively, at different magnifications after subsequent wiping with isopropyl alcohol. The ablated material buildup areas 152A, 152B may be reduced as well as the depressions 154. FIGS. 15A and 15B are top close-up views of the optical surface 150 and the end face 34 of FIGS. 14A and 14B, respectively, after subsequent hand polishing. The ablated material buildup areas 152A, 152B appear gone, as do the depressions 154 such that the optical surface 150 is now in a final form.

Advantageously, the laser cleaving systems and methods disclosed herein may be made even more effective and/or efficient by tuning the laser(s) to different wavelengths when cleaving the end portion 44 of the optical fiber 44. For example, when using the laser cleaving system 50 with the laser 52 being a quantum cascade laser or other tunable laser, the laser beam 54 may initially be emitted at a first wavelength to ablate some of the end portion 44 of the optical fiber 40 before being tuned to a different wavelength and ablating an additional amount of the end portion 44. The absorption index of the optical fiber 40 may be less at the first wavelength than at the different wavelength so that less energy is absorbed at the surface of the optical fiber 40. The energy is instead absorbed in a greater portion of the optical fiber 40 so that a "deeper" cut is made during the initial stages of operation (e.g., first pulses of the laser 52). By subsequently switching to a wavelength with a higher absorption index, smaller amounts of the optical fiber 40 are ablated so that the distance $H_1$ may be controlled more accurately (e.g., to result in values less than 20 µm, or even less than 10 µm). This process of switching to different wavelengths may be performed a number of times such that the laser beam 54 is emitted at a number of different wavelengths (e.g., two, three, four, etc.) over the course of the overall method of forming the optical surface 150. The final wavelength may be one within 0.1 µm of the absorption peak of the optical fiber 40 to carefully control the distance $H_1$. Additionally, this process of switching to different wavelengths may even be performed with other laser cleaving systems and methods where one or more laser beams are not reflected off an end face of a ferrule before being incident on an end portion of an optical fiber.

It was mentioned above that the laser cleaving systems and methods disclosed herein are particularly suited for ferrules in which an optical fiber is secured using a bonding agent that heats and cools quickly. The bonding agent may be an adhesive with a melting point of 290° C. or less, for example. The bonding agent may also cool relatively quickly (e.g., in less than 30 seconds, less than 20 seconds, less than 15 seconds) once heating is stopped. Details of exemplary bonding agents (e.g., as the bonding agent 46 in FIG. 3) will now be described.

In one embodiment, the bonding agent comprises a partially cross-linked polymer resin and a coupling agent that provides chemical coupling between the polymer resin and one or both of the optical fiber and ferrule. The presence of the coupling agent allows the polymer resin to be selected primarily for heating and cooling properties rather than adhesion properties relative to the optical fiber and/or ferrule. The bonding agent may comprise a majority of the polymer resin so as to be largely characterized by the heating and cooling properties of the polymer resin. For example, the bonding agent may comprise between about 0.1 to about 10 parts by weight of the coupling agent per 100 parts by weight of the partially cross-linked polymer resin. In various embodiments, there may be about 0.1, about 0.5, about 1, about 2, about 4, about 6, about 8, or about 10 parts by weight of the coupling agent per 100 parts by weight of the partially cross-linked polymer resin, or a range between any combination of the above mentioned weight ratios.

The partially cross-linked polymer resin may comprise a thermoplastic resin. As used herein, a "thermoplastic resin" is a material that comprises a polymeric material that will repeatedly soften when heated and harden when cooled, without polymer chains cross-linking. For example, a thermoplastic resin may be repeatedly made soft and hard through heating and cooling cycles. As used herein, "cross-linking" or "cross-linked" refers to the chemical bonding that connects a polymer chain to an adjacent polymer chain, and "cross-linkable" describes a chemical species that becomes at least partially cross-linked when sufficient heat is applied. As used herein, "partially cross-linking" or "partially cross-linked" refers to chemical bonding that connects a polymer chain to an adjacent polymer chain where not all adjacent chains are bonded, in contrast to thermoplastic and thermoset resins; and "partially cross-linkable" describes a chemical species that becomes partially cross-linked when sufficient heat is applied. It should be understood that when the terms "partially cross-linked" and "partially cross-linkable" are used to describe polymers of adhesive compositions described herein, the same resin is being described at a specific time of prior to cross linking or following cross-linking.

For example, a resin may be described as partially cross-linkable when it is packed into the ferrule and has not yet been heated to be partially cross-linked. Following heating, the resin may be partially cross-linked. In another embodiment, the resin may be cross-linked prior to the heating step immediately prior to the insertion of the optical fiber, such as if the adhesive composition is injection molded prior to being placed into the ferrule. However, an injection molded adhesive composition may still be described as partially cross-linkable, as cross-linking may take place in the heating step immediately prior to optical fiber insertion. It should further be understood that when the adhesive composition is described herein, if the adhesive composition is said to comprise a partially cross-linked resin, then that is equivalent to saying that the adhesive composition comprises a partially cross-linkable resin prior to that cross linking step. While cross-linking may provide a permanence to fix structures securely together during connector assembly and thermoplastic resins may allow for materials to flow in a controlled manner for ferrule manufacturing, partially cross-linking materials may uniquely and synergistically have such advantages of both types of materials.

In one embodiment, the bonding agent may comprise the property that at least about 5% by weight of the polymer resin is cross-linked or cross-linkable and at least about 5% by weight of the polymer resin is not cross-linked or cross-linkable. In another embodiment, the bonding agent may comprise the property that at least about 10% by weight of the polymer resin is cross-linked or cross-linkable and at least about 10% by weight of the polymer resin is not cross-linked or cross-linkable. In another embodiment, the adhesive composition may comprise the property that at least about 20% by weight of the polymer resin is cross-linked or cross-linkable and at least about 20% by weight of the polymer resin is not cross-linked or cross-linkable.

In some embodiments, the partially cross-linked polymer resin materials may have a melting point at temperatures of less than 250° C., 270°, or 290° C. In some embodiments, the partially cross-linked resin materials may crosslink in the presence of air at temperatures of less than 300° C., 325° C., or 350° C. Additionally, the partially cross-linked polymer resin may be capable of bonding in less than about 5 minutes, 3 minutes, 1 minute, 30 seconds, or even 15 seconds. In contemplated embodiments, the partially cross-linked polymer resin does not require mixing, does not de-air, and/or does not have pot life issues. In one embodiment, the bonding agent may comprise one or more partially cross-linked polymer resins, such as, but not limited to, poly(phenylene sulfide). For example, the poly(phenylene sulfide) may comprise, but is not limited to, Ryton® V-I, available from Chevron Phillips Chemical Company LLC of The Woodlands, Tex., or Fortron® 0205P4 or Fortron® 0203P6, available from Ticona GmbH of Frankfurt, Germany.

In other embodiments, the bonding agent may comprise one or more partially or non-partially cross-linked resins such as, but not limited to, a poly(phenylene oxide), a polyamide-imide, a liquid crystal polymer, a polyether ether ketone, a cyclic olefin copolymer, or combinations thereof. One example of a poly(phenylene oxide) is Sabic SA-102, available from SABIC of Riyadh, Saudi Arabia. One example of a liquid crystal polymer is Veectra® A950 VF300I, available from Ticona of Florence, Ky. One example of a polyether ether ketone is Ketaspire® KT-85I, available from Solvay S.A. of Brussels, Belgium. One example of a cyclic olefin copolymer is TOPAS® 5013L-10 from Topas Advanced Polymers.

The coupling agent may comprise a wide variety of one or more suitable coupling agents. In one embodiment, the coupling agent may comprise an epoxy, amino, or mercapto-functional silane. The silane group on the coupling agent may comprise an alkoxysilane, an oxime silane, an acetoxy silane. Alternatively, or in combination with the above mentioned silane coupling agent, the coupling agent may comprise a zirconate, a titanate, or combinations thereof. In one embodiment, the coupling agent may comprise glycidoxypropyl trimethoxysilane, such as gamma-glycidoxypropyltrimethoxy silane. For example, the coupling agents may comprise Silquest® A-I87, Silquest® A-1100, available from Crompton Corp. of Middlebury, Conn., or Ken-React® KR55, available from Kenrich Petrochemicals, Inc. of Bayonne, N.J.

The combination of a coupling agent and a partially cross-linked polymer resin may produce enhanced adhesion strength. The coupling agent may provide a chemical coupling between the inorganic surface of the optical fiber and/or the ferrule, and the polymer matrix of the resin. After cooling, the partially cross-linked polymer resin, which may have no functional groups which can react with inorganic surfaces, may be covalently bonded to one or both of the optical fiber or ferrule by the coupling agent. The coupling agent may comprise functional groups specifically capable of bonding covalently to inorganic materials, and groups specifically capable of reacting with organic functional groups. The organic functional group on the coupling agent can comprise epoxy, amino, mercapto, acrylic ester or any other organic functional group. In one embodiment, the functional group on the coupling agent which reacts with the inorganic materials is an alkoxysilane. Other possible groups include an oxime- or acetoxy-silane. In addition to silane coupling agents, zirconates and titanates have also been shown to have such coupling capabilities.

The bonding agents described herein may further comprise at least one thermoset resin. A wide variety of thermoset resin materials may be used as a component of the bonding agent. As used herein, a "thermoset resin" is a material that comprises at least one polymeric material that will undergo or has undergone a chemical reaction by the action of heat, catalysts, ultraviolet light, etc., leading to a relatively infusible state. Examples of suitable thermoset resins may include, but are not limited to, epoxy resins, such as Bisphenol A based epoxy or epoxy novo lacs. In one embodiment, there may be between about 1 to about 85 parts by weight of the thermoset resin per 100 parts by weight of the partially cross-linked polymer resin. In various embodiments, there may be about 1, about 5, about 10, about 30, about 50, about 70, about 80, or about 85 parts by weight of the thermoset resin per 100 parts by weight of the partially cross-linked polymer resin, or a range between any combination of the above mentioned weight ratios.

The combination of a thermoset resin and a partially cross-linked polymer resin may produce enhanced adhesion strength. Without being bound by theory, it is believed that after cure at temperature above 300° C., the bonding agent may form a uniform system of thermoplastics and a cross-linked network structures throughout the polymer matrix. The cross-link structure may be formed not only by the thermoset but also between thermoplastics and thermosets. For example, the partially cross-linked thermoplastic resin could react with the thermoset resin at elevated temperatures by a phenol group at the end of the polymer chain. The formed network structure may improve integrity of the adhesives and corresponding fiber optic connectors to resist environmental aging and creep under shear stress and promote bonding strength on the substrates.

In one embodiment, the adhesive composition may further comprise a curing agent. Without being bound by theory, it is believed that the curing agent may aid in curing the thermoset resin, such as an epoxy resin, if the bonding agent comprises a thermoset resin, and/or may aid in curing the coupling agent. For example, the curing agent may react with the epoxy groups of a coupling agent and/or thermoset resin. The curing agent may comprise one or more curing agents available, such as, but not limited to, an anhydride curative, an amide curative, an aromatic amine curative, a dianhydride, a mono acid anhydride, a guanidine compound, an amine curative, or combinations thereof. For example, the curing agent may comprise a dicyandiamide, pyromellitic dianhydride, a dodecylsuccinic anhydride, a urone, a urea, a melamine, a dicyandiamide, or combinations thereof. In one embodiment, the bonding agent further comprises between about 0.2 to about 50 parts by weight of a curing agent per 100 parts by weight of the coupling agent. In various embodiments, there may be about 0.2, about 0.5, about 1, about 5, about 10, about 20, about 30, about 40, or about 50 parts by weight of the curing agent per 100 parts by weight of the coupling agent, or a range between any combination of the above mentioned weight ratios. In another embodiment, the bonding agent further comprises between about 0.2 to about 50 parts by weight of a curing agent per 100 parts by weight of the thermoset resin. In various embodiments, there may be about 0.2, about 0.5, about 1, about 5, about 10, about 20, about 30, about 40, or about 50 parts by weight of the curing agent per 100 parts by weight of the thermoset resin, or a range between any combination of the above mentioned weight ratios. In yet another embodiment, the adhesive composition further comprises between about 0.2 to about 100 parts by weight of a curing agent per 100 parts by weight of the sum of the weight of the thermoset resin and the weight of the coupling agent. In various embodiments, there may be about 0.2, about 0.5, about 1, about 5, about 10, about 30, about 50, about 70, about 90, or about 100 parts by weight of the curing agent per 100 parts by weight of the sum of the weight of the thermoset resin and the weight of the coupling agent, or a range between any combination of the above mentioned weight ratios.

In one embodiment, the bonding agent may further comprise one or more filler materials. In one embodiment, the filler material is a mineral composition, such as at least one pyrophosphate of a metal. For example, the metal may comprise cobalt or magnesium, such that the filler material is magnesium pyrophosphate, cobalt pyrophosphate, or combinations thereof. In one embodiment, the bonding agent further comprises between about 0.5 to about 85 parts by weight of a filler material per 100 parts by weight of the partially cross-linked resin. In various embodiments, there may be about 0.5, about 1, about 5, about 10, about 30, about 50, about 70, about 80, or about 85 parts by weight of the filler material per 100 parts by weight of the thermoset resin, or a range between any combination of the above mentioned weight ratios.

In one embodiment, the filler material may comprise a material with a negative coefficient of thermal expansion. As used herein, a material with a negative coefficient of thermal expansion refers to a material that goes through a phase inversion with the accompanying decrease in volume at a temperature near to, for example within about 50° C., about 30° C., about 20° C., or about 10° C., of the glass transition temperature of the partially cross-linked resin. Without being bound by theory, it is believed that the inclusion of a material with a negative coefficient of thermal expansion may aid in maintaining the density, and therefore the volume, of the adhesive composition when it is heated, such that it does not expand as to apply excessive pressure to the ferrule, in some circumstances causing the ferrule to crack or rupture.

It should be understood that various components of the bonding agent embodiments disclosed herein may be combined in any combination in any ratio disclosed herein. Such various components include partially cross-linked thermoplastic resins, coupling agents, thermoset resins, curing agents, and filler materials. Furthermore, while desirable properties of the bonding agent may be caused by the combination of only two or more of the various components, any combination of the components is contemplated herein. It should further be understood that where a component of the bonding agent is referenced, it may be an optional component is some embodiments, and is not required to be in the bonding agent is all embodiments.

Advantageously, the laser cleaving systems and methods disclosed herein may utilize lasers that are also suitable for use when securing the optical fiber 40 relative to the ferrule 12. For example, prior to operating the laser(s) 52 of a laser cleaving system to form the optical surface 150 on the end portion 44 of the optical fiber 40, the laser(s) 52 may be used to heat/activate the bonding agent 46 (FIG. 3), after which the bonding agent 46 is allowed to cool to secure the optical fiber 40 in the ferrule bore 42. The bonding agent 46 may be pre-loaded into the ferrule bore 42 or supplied to the ferrule bore 42 after inserting the optical fiber 40 through the ferrule bore 42. An exemplary method involving the latter will now be described.

Figure 16:
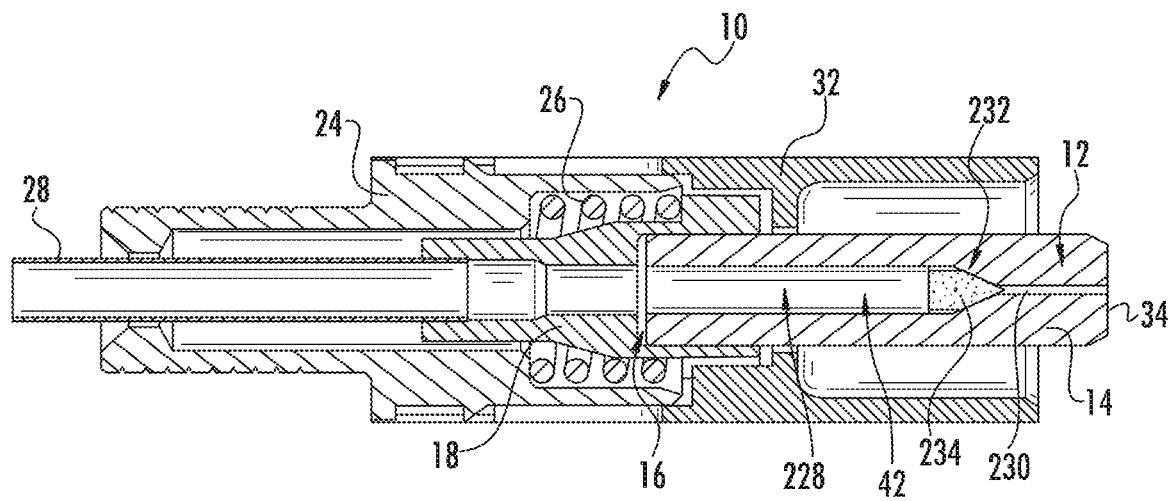
FIG. 16 is a cross-sectional side view of one embodiment of the fiber optic connector of FIG. 1.

As shown in FIG. 16, the ferrule bore 42 may include a first section, shown as bore section 228, a second section, shown as micro-hole 230, and a transition section, shown as tapered section 232. Generally, the bore section 228 has a diameter greater than the diameter of micro-hole 230, and the tapered section 232 has a diameter that decreases as the distance to the end face 34 decreases (e.g., in the direction from left to right in the orientation of FIG. 16). The decreasing diameter of the tapered section 232 provides the transition from the larger diameter of the bore section 228 to the smaller diameter of the micro-hole 230. In the embodiment shown, the ferrule 12 is a single, integral piece of material through which the ferrule bore 42 is formed.

The bonding agent 46, shown as adhesive plug 234 prior to being heated, is located within ferrule bore 42. As mentioned above, the adhesive composition of the bonding agent 46 (and, therefore, the adhesive plug 234) is a meltable material configured to bond the optical fiber 40 to the ferrule 12 within the micro-hole 230. In various embodiments, the adhesive plug 234 may be a substantially solid body or solid powder formed from a meltable adhesive composition that may be preloaded or stored within the ferrule 12 for a significant amount of time (e.g., an hour, a day, a year, etc.) before an optical fiber 40 is to be coupled to the ferrule 12. In one such embodiment, the adhesive plug 234 may be formed within ferrule 12 by the manufacturer of the ferrule 12.

As shown, the adhesive plug 234 is located primarily within the tapered section 232 and within the inner end of the bore section 228. The adhesive plug 234 is also positioned adjacent the entrance to the micro-hole 230 from tapered section 232. In one embodiment, when the ferrule 12 is at normal processing temperatures or at room temperature (e.g., between about 15° C. and 30° C., less than 40° C., etc.), the adhesive plug 234 is substantially solid such that it extends between opposing inner surfaces of the tapered section 232 and substantially blocks the opening into the micro-hole 230 from the tapered section 232.

Figure 17:
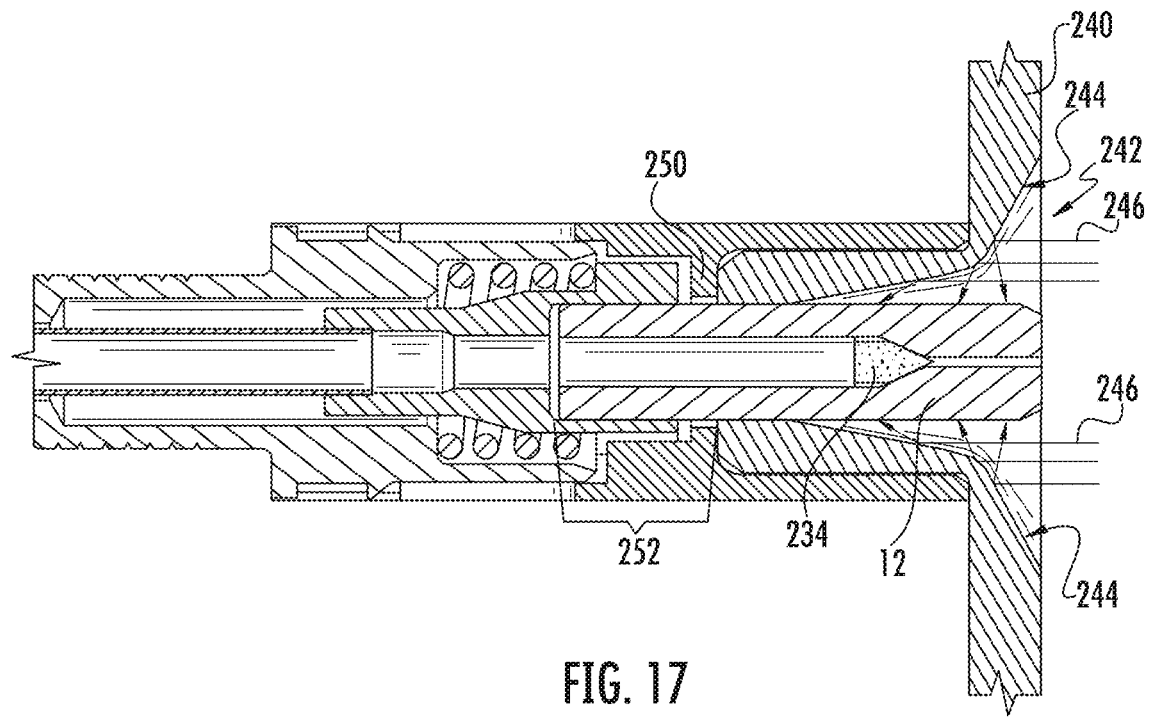
FIG. 17 is a cross-sectional side view similar to FIG. 16, but showing the fiber optic connector during a heating step.
Figure 18:
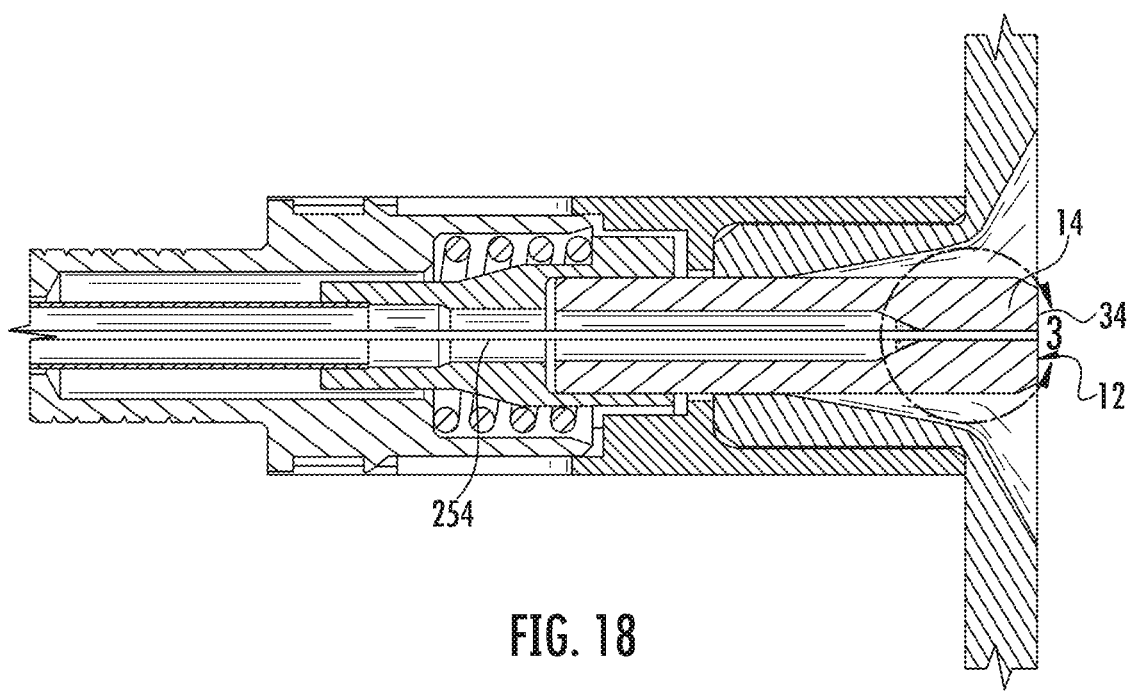
FIG. 18 is a cross-sectional side view similar to FIG. 17, but showing the fiber optic connector after an optical fiber has been inserted through a ferrule of the fiber optic connector.

Referring generally to FIGS. 17 and 18, melting of the adhesive plug 234 and coupling of the optical fiber 40 to the ferrule 12 is shown according to an exemplary embodiment. The connector 10 may be configured to be used in conjunction with a heating system that focuses heat onto the ferrule 12 in such a way that the adhesive plug 234 is melted without the end face 34 and/or approximately the first third of the ferrule 12 adjacent the end face 34 reaching a temperature high enough to damage inner housing 24 and/or crimp body of the connector 10.

Referring to FIG. 17, the ferrule 12 is shown supported by a heating port 240. The heating port 240 includes an opening 242, and when supported within the heating port 240, the end face 34 of the ferrule 12 extends through the opening 242. The heating port 240 includes a reflector 244 that surrounds the opening 242. The reflector 244 includes angled reflective surfaces that are positioned relative to the ferrule 12 to focus heat onto a portion of the ferrule 12 to melt the adhesive plug 234. Again, as mentioned above, heating may be accomplished by using one or more of the same lasers subsequently used to cleave the end portion 44 of the optical fiber 40. In one embodiment, heating may be accomplished by focusing one or more laser beams 246 on a front third of the ferrule 12 (i.e., the third of the ferrule 12 adjacent the end face 34) by the reflector 244.

In various embodiments, heat is focused onto the portion of the ferrule 12 that includes the adhesive plug 234 and the micro-hole 230 such that the adhesive plug 234 is melted while heating of other areas of the ferrule 12 is limited. In one embodiment, during heating, the portion of the ferrule 12 including the adhesive plug 234 is heated to above 290° C. while the temperature of the insertion end 16 of the ferule 12 remains below 250° C. In another embodiment, during heating, the portion of the ferrule 12 including the adhesive plug 234 is heated to above 350° C. while the temperature of the insertion end 16 of the ferule 12 remains below 250° C. In another embodiment, during heating, the portion of the ferrule 12 including the adhesive plug 34 is heated to above 400° C. while the temperature of the insertion end 16 of the ferule 12 remains below 250° C. In another embodiment, during heating, the portion of the ferrule 12 including the adhesive plug 234 is heated to above 350° C. while the temperature of the insertion end 16 of the ferule 12 remains below 200° C. In another embodiment, during heating, the portion of the ferrule 12 including the adhesive plug 234 is heated to between 400 and 600° C. while the temperature of the insertion end 16 of the ferrule 12 remains below 250° C.

In one embodiment, the inner housing 24 includes a clamping member 250, and in such embodiments, the ferrule 12 includes an inner portion 252 that is the portion of the ferrule 12 located inward from the clamping member 250 within the housing 24. In the orientation of FIG. 17, the inner portion 252 of the ferrule 12 is the portion of the ferrule 12 located to the left of the clamping member 250. In such embodiments, during heating and melting of the adhesive plug 234, the inner portion 252 of the ferrule 12 is maintained below a temperature that will damage the inner housing 24. In one such embodiment, the portion of the ferrule 12 including the adhesive plug 234 is heated to above 290° C. while the temperature of the inner portion 252 the ferrule 12 remains below 250° C. In another embodiment, the portion of the ferrule 12 including the adhesive plug 234 is heated to above 290° C. while the temperature of the inner portion 252 the ferrule 12 remains below 200° C. In another embodiment, the portion of the ferrule 12 including the adhesive plug 234 is heated to above 350° C. while the temperature of the inner portion 252 the ferrule 12 remains below 200° C. In another embodiment, the portion of the ferrule 12 including the adhesive plug 234 is heated to between 400 and 600° C. while the temperature of the inner portion 252 the ferrule 12 remains below 200° C.

It is believed that the larger diameter of the bore section 228 (as compared to the smaller diameter of the micro-hole 230) results in a large portion of the volume of the ferrule 12 being filled with air, and the air with the ferrule 12 may act as a buffer or insulator to heat transfer along the length of the ferrule 12. Thus, it is believed that the insulating effect of the air within the bore section 228 contributes to maintaining the inner portion 252 of the ferrule 12 at a low temperature during heating, as discussed above. It should be understood that the temperature to which the portion of the ferrule 12 including the adhesive plug 234 is heated will be based upon the melting temperature of the particular bonding agent located within in the ferrule 12.

Referring to FIG. 18, once the adhesive plug 234 has been heated above its melting temperature (e.g., 290° C., 350° C., 400° C., etc.), the adhesive becomes flowable, allowing the optical fiber 40 to be inserted through ferrule bore 42. As shown, the optical fiber 40 is inserted into the ferrule bore 42 in the direction from the insertion end 16 toward the mating end 14 and end face 34. The optical fiber 40 passes through the larger diameter bore section 228 and then encounters the flowable adhesive material 256 (i.e., the melted adhesive plug 234). The optical fiber 40 passes through the tapered section 232 and into the micro-hole 230. The tapered section 232 acts to funnel or direct the melted adhesive composition 256 into the micro-hole 230, and the viscosity of melted adhesive composition 256 allows the optical fiber 40 to pull the adhesive 256 into the micro-hole 230. Thus, as the optical fiber 40 passes through the micro-hole 230, a thin layer of adhesive 258 surrounds the outer surface of the optical fiber 40 and fills the space between the optical fiber 40 and the inner surface of the micro-hole 230. Then with the optical fiber 40 in place, the ferrule 12 is cooled to allow the melted adhesive to solidify and bond the optical fiber 40 in place within the micro-hole 230, effectively resulting in the configuration shown in FIG. 5 and discussed above. Following solidification of the adhesive, the additional steps to finish the connector 10, including forming the optical surface 150 using the systems and methods described above, may be performed. In some embodiments, the ferrule 12 may be actively cooled, for example by blowing air, to speed the cooling and solidification process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of forming an optical surface on an end portion of an optical fiber, comprising:
   inserting the optical fiber through a ferrule bore of a ferrule so that an end portion of the optical fiber extends past an end face the ferrule;
   securing the optical fiber to the ferrule with a bonding agent that is disposed within at least a portion of the ferrule bore;
   emitting at least one laser beam from at least one laser;
   directing the at least one laser beam from the at least one laser to the end face of the ferrule, wherein the least one laser beam is shaped into an ellipse when directed to the end face of the ferrule and comprises at least 90 percent linearly-polarized light incident on the end face of the ferrule as S-polarized light; and
   operating the at least one laser so that the S-polarized light reflects off the end face of the ferrule and cleaves the end portion of the optical fiber.

2. A method according to claim 1, wherein the at least one laser beam is directed to the end face of the ferrule at a location spaced at least 5 μm from the ferrule bore.

3. A method according to claim 2, wherein the location on the end face of the ferrule to where the at least one laser beam is directed is spaced between 5 μm and 40 μm from the ferrule bore.

4. A method according to claim 1, wherein the at least one laser beam is directed to have a focal point on the end portion of the optical fiber after reflecting off the end face of the ferrule.

5. A method according to claim 1, wherein the at least one laser is operated to cleave the end portion of the optical fiber less than 20 μm from the end face of the ferrule.

6. A method according to claim 1, wherein the at least one laser beam is directed so that the ellipse results in an elliptical beam spot on the end face of the ferrule, and further wherein the elliptical beam spot has a dimension of at least 30 μm along a minor axis.

7. A method according to claim 1, wherein the at least one laser beam is directed so that the ellipse results in an elliptical beam spot on the end face of the ferrule, and further wherein the elliptical beam spot has a dimension of at least 50 μm along a major axis.

8. A method according to claim 1, wherein the at least one laser beam is emitted with a wavelength between 8.0 and 9.4 μm.

9. A method according to claim 1, wherein the bonding agent disposed within the ferrule bore comprises a partially cross-linked polymer resin and a coupling agent that provides chemical coupling between the polymer resin and one or both of the optical fiber and ferrule.

10. A method according to claim 1, wherein the the optical fiber is secured in the ferrule bore before operating the at least one laser to cleave the end portion of the optical fiber, and wherein the optical fiber is secured by:
   operating the at least one laser to heat the bonding agent to a temperature sufficient to melt the bonding agent; and
   cooling the bonding agent.

11. A method according to claim 1, wherein the at least one laser beam comprises a laser fluence of less than 100 J/cm$^2$ when incident on the end face of the ferrule.

12. A method according to claim 1, wherein the at least one laser beam comprises a laser fluence of less than 10 J/cm$^2$ when incident on the end face of the ferrule.

13. A method according to claim 1, wherein the at least one laser beam is directed to the end face of the ferrule without relative movement between a profile of the at least one laser beam and the ferrule when the at least one laser beam is emitted.

14. A method according to claim 13, wherein operating the at least one laser comprises:
   operating the at least one laser for several pulses in a first position of the at least one laser relative to the ferrule;
   causing relative movement between the at least one laser and the ferrule to bring the at least one laser to a second position relative to the end of the ferrule; and
   operating the at least one laser for several pulses in the second position of the at least one laser relative to the ferrule.

15. A method according to claim 1, wherein the at least one laser beam is directed to the end face of the ferrule by a focusing system that includes one or more non-spherical lenses for shaping the at least one laser beam into the ellipse, the method further comprising moving the focusing system to change the location on the end face to where the at least one laser beam is directed.

16. A method according to claim 1, further comprising sweeping the at least one laser beam across the end face of the ferrule when the at least one laser emits the at least one laser beam.

17. A method according to claim 1, wherein operating the at least one laser comprises reflecting portions of the at least one laser beam off the end face of the ferrule at two different locations on the end face to cleave the end portion of the optical fiber.

18. A method according to claim 1, wherein the at least one laser beam comprises two or more separate laser beams, and wherein operating the at least one laser comprises reflecting each of the separate laser beams off the end face of the ferrule at a different location on the end face to cleave the end portion of the optical fiber.

19. A method of forming an optical surface on an end portion of an optical fiber, comprising:
   inserting the optical fiber through a ferrule bore of a ferrule so that an end portion of the optical fiber extends past an end face the ferrule;
   securing the optical fiber to the ferrule with a bonding agent that is disposed within at least a portion of the ferrule bore;
   emitting at least one laser beam from at least one laser, wherein the at least one laser is tuned to a first wavelength;
   directing the at least one laser beam from the at least one laser to the end face of the ferrule, wherein the least one laser beam is shaped into an ellipse when directed to the end face of the ferrule;
   operating the at least one laser so that the at least one laser beam reflects off the end face of the ferrule and cleaves the end portion of the optical fiber by:
      (a) ablating some of the end portion of the optical fiber with the at least one laser beam emitted at the first wavelength;
      (b) tuning the at least one laser to a different wavelength; and
      (c) ablating an additional amount of the end portion of the optical fiber with the at least one laser beam emitted at the different wavelength.

20. A method according to claim 19, wherein the at least one laser beam is emitted and directed so that the at least one laser beam comprises at least 90 percent linearly-polarized light incident on the end face of the ferrule as S-polarized light.

21. A method according to claim 19, wherein the at least one laser beam is emitted and directed so that the at least one laser beam has a laser fluence of less than 100 J/cm$^2$ when incident on the end face of the ferrule.

22. A method according to claim 19, wherein the at least one laser beam is emitted and directed so that the at least one laser beam has a laser fluence of less than 10 J/cm$^2$ when incident on the end face of the ferrule.

23. A method according to claim 19, wherein the absorption index of the optical fiber to the at least one laser beam is less at the first wavelength than at the different wavelength.

24. A method according to claim 19, wherein the different wavelength is within 0.1 ∞m of the peak absorption wavelength the optical fiber.

25. A method according to claim 19, further comprising:
   repeating steps (b) and (c) of claim 19 at least once such that the at least one laser beam is operated at three or more different wavelengths to cleave the end portion of the optical fiber.

26. A system for forming an optical surface on an end portion of an optical fiber that protrudes from an end face of a ferrule after extending through a ferrule bore, the system comprising:
   at least one laser configured to emit at least one laser beam; and a fixture configured to securely support the ferrule relative to the at least one laser;
wherein the system is configured to shape the at least one laser beam into an ellipse and direct the at least one laser beam to the end face of the ferrule so that:
the at least one laser beam comprises at least 90 percent linearly-polarized light incident on the end face of the ferrule as S-polarized light; and
the S-polarized light reflects off the end face of the ferrule to be incident on the end portion of the optical fiber.

27. A system according to claim 26, wherein the system is configured to direct the at least one laser beam to a location on the end face of the ferrule that is spaced at least 5 μm from the ferrule bore.

28. A system according to claim 26, wherein the system is configured to direct the at least one laser beam to a location on the end face of the ferrule that is spaced between 5 μm and 40 μm from the ferrule bore.

29. A system according to claim 26, wherein the system is configured so that the at least one laser beam has an elliptical beam spot on the end face of the ferrule, and further wherein the elliptical beam spot has a dimension of at least 30 μm inn along a minor axis and a dimension of at least 50 μm along a major axis.

30. A system according to claim 26, wherein the at least one laser is tunable to different wavelengths.

\* \* \* \* \*

UNITED STATES PATENT AND TRADEMARK OFFICE
CERTIFICATE OF CORRECTION

PATENT NO. : 10,610,970 B2
APPLICATION NO. : 15/716824
DATED : April 7, 2020
INVENTOR(S) : Joel Patrick Carberry et al.

It is certified that error appears in the above-identified patent and that said Letters Patent is hereby corrected as shown below:

In the Specification

In Column 1, Line 8, delete "9,810,847" and insert -- 9,810,847, --, therefor.

In the Claims

In Column 16, Line 47, Claim 1, delete "end face the ferrule" and insert -- end face of the ferrule --, therefor.

In Column 17, Line 26, Claim 10, delete "the the" and insert -- the --, therefor.

In Column 18, Line 14, Claim 19, delete "end face the ferrule" and insert -- end face of the ferrule --, therefor.

In Column 18, Line 55, Claim 24, delete "∞m" and insert -- µm --, therefor.

In Column 19, Line 24, Claim 29, delete "µm inn" and insert -- µm --, therefor.

Signed and Sealed this
Twenty-first Day of July, 2020

Andrei Iancu
*Director of the United States Patent and Trademark Office*